United States Patent
Palop et al.

(10) Patent No.: US 12,536,817 B2
(45) Date of Patent: Jan. 27, 2026

(54) AUDIO-VISUAL PILOT ACTIVITY RECOGNITION SYSTEM AND METHOD

(71) Applicant: Rockwell Collins, Inc., Cedar Rapids, IA (US)

(72) Inventors: Hector Palop, Cork (IE); Naresh Yarlapati Ganesh, Cork (IE)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 18/587,484

(22) Filed: Feb. 26, 2024

(65) Prior Publication Data
US 2024/0290113 A1   Aug. 29, 2024

(30) Foreign Application Priority Data
Feb. 24, 2023   (EP) ..................................... 23158547

(51) Int. Cl.
| | | |
|---|---|---|
| *G06V 20/59* | (2022.01) | |
| *G06T 7/50* | (2017.01) | |
| *G06T 7/70* | (2017.01) | |
| *G06T 17/00* | (2006.01) | |
| *G10L 21/0272* | (2013.01) | |
| *G10L 25/84* | (2013.01) | |

(52) U.S. Cl.
CPC .............. *G06V 20/597* (2022.01); *G06T 7/50* (2017.01); *G06T 7/70* (2017.01); *G06T 17/00* (2013.01); *G10L 21/0272* (2013.01); *G10L 25/84* (2013.01)

(58) Field of Classification Search
CPC ..................................................... G06V 20/597
USPC ............................................................ 348/148
See application file for complete search history.

(56) References Cited

U.S. PATENT DOCUMENTS

| | | | |
|---|---|---|---|
| 10,322,728 B1 * | 6/2019 | Porikli | G06V 10/80 |
| 11,100,316 B2 | 8/2021 | Porikli et al. | |
| 2017/0069312 A1 * | 3/2017 | Sundararajan | G10L 25/72 |
| 2022/0121838 A1 | 4/2022 | Goyal et al. | |
| 2022/0230522 A1 * | 7/2022 | Myers | A61B 5/18 |
| 2023/0001872 A1 | 1/2023 | Torabi et al. | |

FOREIGN PATENT DOCUMENTS

WO   2021198917 A1   10/2021

OTHER PUBLICATIONS

European Search Report dated Jun. 16, 2023; European Application No. 23158547.2.

* cited by examiner

*Primary Examiner* — Amir Shahnami
(74) *Attorney, Agent, or Firm* — Suiter Swantz IP

(57) ABSTRACT

An audio-visual pilot activity recognition system including one or more image collectors, one or more audio collectors, and a processor configured to collect at least one image signal from the one or more image collectors, collect at least one audio signal from the one or more audio collectors, and determine a pilot activity based on the collected at least one image signal and the collected at least one audio signal.

14 Claims, 2 Drawing Sheets

AUDIO-VISUAL PILOT ACTIVITY RECOGNITION SYSTEM AND METHOD

CROSS-REFERENCE AND INCORPORATION BY REFERENCE

This application claims the benefit of priority of European Application No. 23158547.2 filed Feb. 24, 2023, which is hereby incorporated by reference in its entirety.

TECHNICAL FIELD

The present disclosure relates to an audio-visual pilot activity recognition system, e.g. in a cockpit of an aircraft.

BACKGROUND

Pilot state assessment systems may be used to assess the alertness state of a pilot and/or co-pilot during operation of an aircraft. Many systems utilise facial recognition and facial recognition to determine the alertness state of the pilot and/or co-pilot during flight. Such systems may create false alarms of a pilot alertness state. Therefore, there is a need for an improved pilot monitoring system.

SUMMARY

In one aspect, there is provided an audio-visual pilot activity recognition system that includes one or more image collectors, one or more audio collectors, and a processor configured to carry out the following steps: collect at least one image signal from the one or more image collectors. collect at least one audio signal from the one of more audio collectors, and determine a pilot activity based on the collected image signals and the collected audio signals.

The processor may include a data buffer to temporarily store the at least one image signal and the at least one audio signal.

The at least one image signal may be provided through a video feed of the processor to a frame buffer. The at least one image signal may be provided, by the processor, to a first image module that extracts depth information from the image signals; and/or the at least one image signal may be provided, by the processor, to a second image module to determine an image of one or more pilots in a cockpit. If an image of one of more pilots is determined, the at least one image signal may be passed to a third image module to estimate the posture positions of the one or more pilots, wherein the posture positions are detected as two-dimensional keypoints of the one or more pilots joints. The at least one image signal of the first image module and the third image module may be combined in a fourth image module to create a three-dimensional reconstruction of the scene. The at least one image signal from the fourth image module may be passed to a fifth image module for pre-processing the data.

The at least one audio signal may be provided through an audio feed of the processor to a speaker recognition to identify audio signals from the one or more audio collectors, and the system may be configured to detect and isolate pilot speech in the audio signals, and wherein the system is configured to extrapolate the isolated audio signals to be pre-processed in a first audio module.

The at least one image signal and isolated audio signals may be configured to pass to a network architecture module, after pre-processing. The network architecture module may include a first subnetwork module and a second subnetwork module. The at least one image signal may be configured to pass to the first subnetwork module and the isolated audio signals are configured to pass to the second subnetwork module. The network architecture module may be configured to determine if the image signals at the first subnetwork module correspond to the isolated audio signals at the second subnetwork module. The network architecture module may include a fusion layer module that is configured to retrieve corresponding pairs of the at least one image signal and the isolated audio signals. The corresponding pairs of the at least one image signal and the isolated audio signals may be configured to pass to a pilot activity recognition module. The pilot activity recognition module may be configured to determine the pilot activity.

The pilot activity includes one or more, but not limited to, of the following: pilot is seated and manoeuvring; pilot is leaving for a break; pilot is resuming main operation; pilot is inoperative or idle; pilot is interacting with another person and/or pilot; pilot is talking to ground control or Air Traffic Control; pilot is reading or consulting a document; pilot is drinking or eating; pilot is falling; pilot is entering after a break.

The determined pilot activity from the pilot activity recognition module may be configured to pass to a fusion module. The fusion module may be configured to receive information from one or more sensors or modalities to determine a final pilot state. The fusion module may be configured to determine if an alert is needed.

In another aspect, there is provided a method that includes collecting, via a processor, at least one image signal from one or more image collectors, collecting, via the processor, at least one audio signal from one or more audio collectors, and determining, via the processor, pilot activity based on the collected image signals and the collected audio signals.

DETAILED DESCRIPTION

Figure 1:
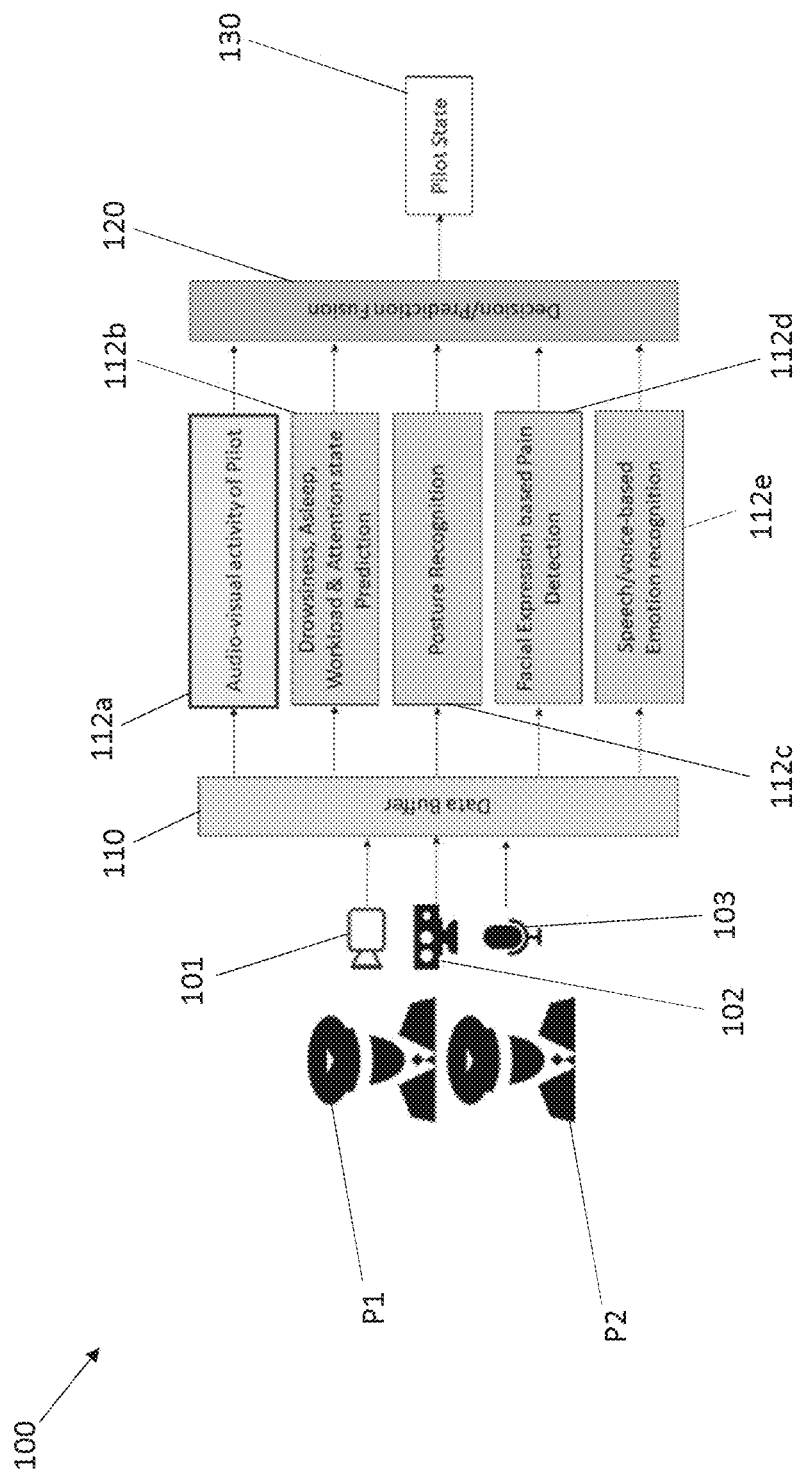
FIG. 1 shows an example of an audio-visual pilot activity recognition system.

FIG. 1 generally shows an example of an audio-visual pilot activity recognition system 100. The audio-visual pilot activity recognition system 100 may be configured to monitor the activity of one or more pilots (e.g. P1 and P2) during flight. The audio-visual pilot activity recognition system 100 may include an image collector 101 (e.g. a camera), an infrared/depth device 102 (e.g. a depth camera or an infrared camera) and an audio collector 103 (e.g. a microphone). Although only one image collector 101, one infrared/depth device 102 and one audio collector 103 are shown in FIG. 1, it is to be understood that any number of image collectors, infrared/depth devices and audio collectors may be used. The infrared/depth device 102 may assist in extracting and reconstructing a three-dimensional scene of the cockpit where the one or more pilots P1/P2 are situated.

As shown in FIG. 1, data from at least one of the image collector 101, the infrared/depth device 102 and the audio collector 103 may be forwarded to be processed through a data buffer 110 to temporarily store data before it is processed. The data buffer 110 can buffer the data from at least one of the image collector 101, the infrared/depth device 102, and the audio collector 103. The data may then be extrapolated from the data buffer 110 to determine the pilot state 130. For example, data may be used by a processor to determine one of the following: a) audio-visual activity of the one or more pilots in step 112*a*, b) determine drowsiness, state of sleep, workload and attention state of the one or more pilots in step 112*b*, c) determine and recognise posture state of the one or more pilots in step 112*c*, d) determine facial expressions of the one or more pilots and detect pain suffered by the one or more pilots based on the determined facial expressions in step 112*d*, and e) determine and recognise emotion based on speech/voice of the one or more pilots in step 112*e*. After one or more of these parameters has been determined, signals are sent through the processor to a decision module 120 where the data is analysed to determine the pilot state 130.

Figure 2:
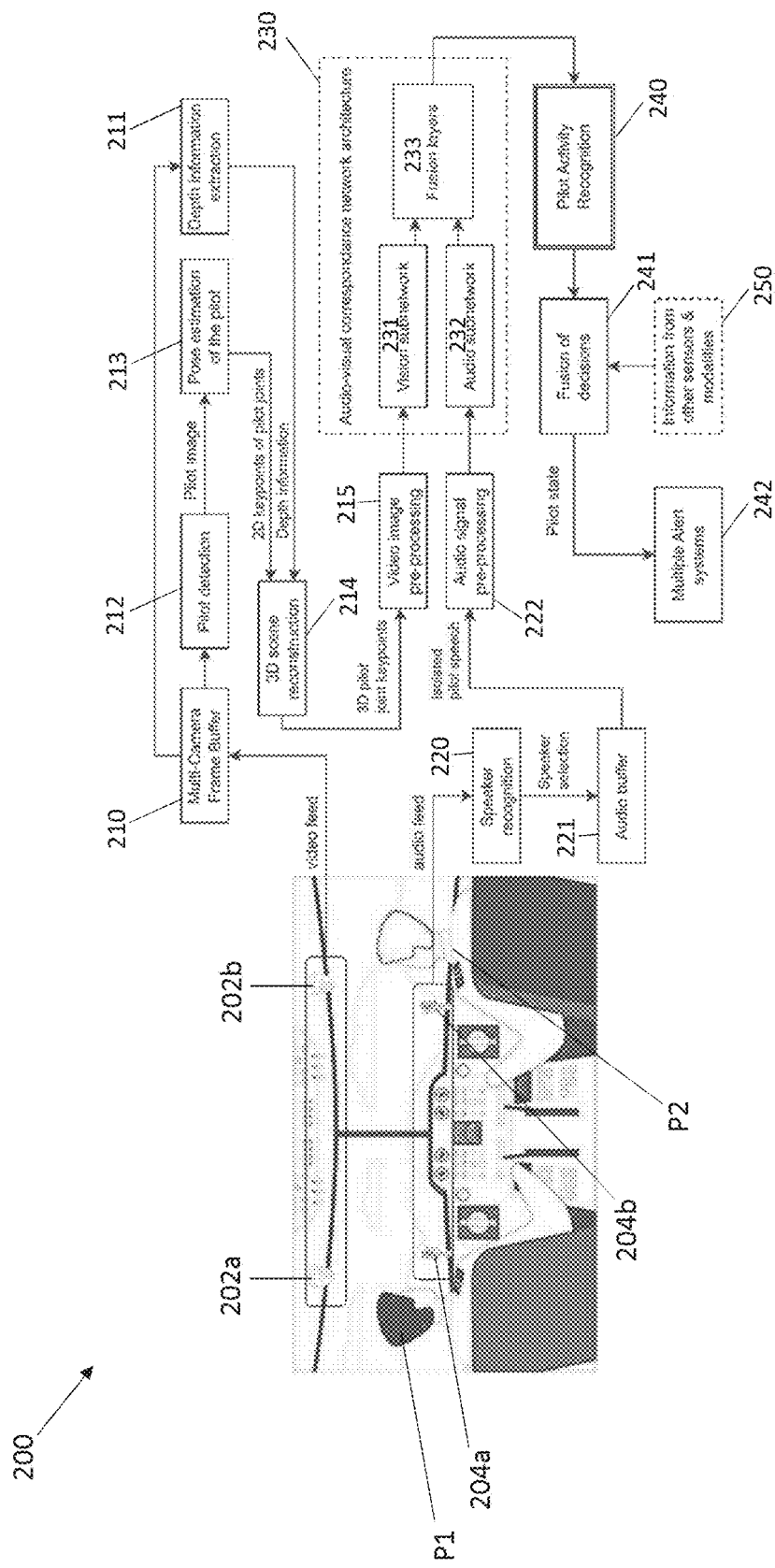
FIG. 2 shows another example of an audio-visual pilot activity recognition system.

FIG. 2 shows further detail of an audio-visual pilot activity recognition system 200. As shown in FIG. 2, a cockpit area may include one or more pilots (e.g. P1 and P2). Further, the cockpit area may also include one or more image collectors (e.g. 202*a* and 202*b*) and one or more audio collectors (e.g. 204*a* and 204*b*). The one or more image collectors 202*a* and 202*b* may be and RGB camera and/or an infrared camera. The one or more audio collectors 204*a* and 204*b* may be a microphone. The one or more image collectors 202*a*, 202*b* are located to face the front side of the one or more pilots P1 and/or P2. The one of more audio collectors 204*a*, 204*b* are located in proximity to the voice of the one or more pilots P1 and/or P2. Although not shown in FIG. 2, it is envisaged that the cockpit area may also include one or more infrared/depth devices (as described above in conjunction with FIG. 1). The one or more image collectors 202*a*, 202*b* collect image signals from the cockpit area to provide images of the one or more pilots P1, P2. The one or more audio collectors 204*a*, 204*b* collect audio from the cockpit area to provide audio signals from the cockpit area. The images and audio signals may be taken during flight.

As can be seen in FIG., the image signals are provided through a 'video feed' of a processor. The image signals move through the video feed to a frame buffer 210 where the image signals are temporarily stored for processing. The image signals provided to the frame buffer 210 are transposed to two different branches. The image signals may be provided from the frame buffer 210 to a 'Depth Information Extraction' module 211 that extracts depth information from the image signals. The image signals may also, or alternatively, be provided to a 'Pilot Detection' module 212 to determine an image of one or more of the pilots P1, P2. If an image of one or more of the pilots P1, P2 is detected, the processor moves the signal to a 'Pose Estimation' module 213 to estimate the posture of the one or more pilots P1, P2. The posture positions are detected as two-dimensional keypoints of the one or more pilots P1, P2 joints. The image signals from the 'Depth Information Extraction' module 211 and the 'Pose Estimation' module 213 are then combined to create a three-dimensional reconstruction of the scene in the '3D Scene Reconstruction' module 214. The image signals from the '3D Scene Reconstruction' module 214 are then sent to a 'Video Image Pre-processing' module 215 for pre-processing. The 'Video Image Pre-processing' module 215 may, for example, remove noise from the image signals, such as noise caused by the one or more image collectors 202*a*, 202*b*, and/or noise caused by the one or more infrared/depth devices. As another example, and in addition or alternatively, the 'Video Image Pre-processing module 215 may reduce the dimensionality of the image signals by, for example, using a Principle Component Analysis technique. The 'Video Image Pre-processing' module 215 may also, additionally or alternatively, synchronize the image signals with the audio signals by, for example, using timestamps or a common reference signal.

Also, as shown in FIG. 2, the audio signals are provided through an 'audio feed' of the processor. The audio signals move through the audio feed to a speaker recognition 220 to identify that the one or more audio collectors 204*a*, 204*b* is retrieving audio signals. If there is more than one audio collector (204*a*, 204*b*), the speaker recognition 220 can identify which audio collector is retrieving audio signals and select that audio collector as the primary audio collector for processing the selected audio signals. Of course, if more than one audio collector 204*a*, 204*b* determined to be retrieving audio signals, any number of audio collectors could be selected as primary and auxiliary audio collectors for processing selected audio signals. The selected audio signals then move to an audio buffer which temporarily stores the audio signals for processing and selection. The system 200 can detect and isolate pilot speech in the audio signals, and extrapolate the isolated audio signals to an 'Audio Signal Pre-processing' module 222 where the audio signals are pre-processed. The 'Audio Signal Pre-processing' module 222 may, for example, remove noise from the image signals, such as noise caused by the one or more audio collectors 204*a*, 204*b*. As another example, and in addition or alternatively, the 'Audio Signal Pre-processing' module 222 may normalize the volume of the audio. The 'Audio Signal Pre-processing' module 222 may also, additionally or alternatively, convert the audio signals into a formal that can be easily processed.

The system 200 may also include an 'Audio-visual Correspondence Network Architecture' module 230. As shown in FIG. 2, the image signals and audio signals are pre-processed in the 'Video Image Pre-processing' module 215 and the 'Audio Signal Pre-processing' module 222. The image signals and the audio signals are then passed to the 'Audio-visual Correspondence Network Architecture' module 230 for further processing. As an example shown in FIG. 2, the image signals are passed to a 'Vision Subnetwork' module 231 and the audio signals are passed to an 'Audio Subnetwork' module 232. The 'Audio-visual Correspondence Network Architecture' module 230 determines if the image signals of the 'Vision Subnetwork' module 231 and the audio signals of the 'Audio Subnetwork' module 232 correspond to each other. Corresponding pairs of signals are those image signals and audio signals that are taken at the same time. Mismatched pairs are those image signals and audio signals that are not taken at the same time. At the 'Fusion Layer' module 233, the corresponding pairs are forwarded through the 'Audio-visual Correspondence Network Architecture' module 230. The mismatched pairs of signals are extracted and discarded by the 'Fusion Layer' module 233.

The 'Pilot Activity Recognition' module 240 then determines pilot activity based on the signals provided by the 'Audio-visual Correspondence Network Architecture' module 230. Pilot activity can be one or more of the following from the non-exhaustive list including: pilot is seated and maneuvering; pilot is leaving for a break; pilot is resuming main operation; pilot is inoperative or idle in their seat; pilot is interacting with another person/pilot; pilot is talking to ground control or Air Traffic Control; pilot is reading or consulting a document; pilot is drinking or eating; pilot is falling; and pilot is entering after a break.

Once the pilot activity has been determined by the 'Pilot Activity Recognition' module 240, the information is sent to a 'Fusion of Decisions' module 241 which may be additionally provided with information from other sensors and modalities in the system (e.g. from module 250). The 'Fusion of Decisions' module 241 can then determine a final pilot state and determine if an alert needs to be raised in a 'Multiple Alert Systems' module 242.

Although this disclosure has been described in terms of preferred examples, it should be understood that these examples are illustrative only and that the claims are not limited to those examples. Those skilled in the art will be able to make modifications and alternatives in view of the disclosure which are contemplated as falling within the scope of the appended claims.

The invention claimed is:

1. An audio-visual pilot activity recognition system, comprising:
one or more image collectors;
one or more audio collectors; and
a processor configured to carry out the following steps:
collect at least one image signal from the one or more image collectors;
collect at least one audio signal from the one or more audio collectors; and
determine a pilot activity based on the collected at least one image signal and the collected at least one audio signal;
wherein the at least one image signal is provided through a video feed of the processor to a frame buffer; and
wherein the at least one image signal is provided, by the processor, to a first image module configured to extract depth information from the at least one image signal.

2. The audio-visual pilot activity recognition system according to claim 1, wherein the processor comprises a data buffer configured to temporarily store the at least one image signal and the at least one audio signal.

3. The audio-visual pilot activity recognition system according to claim 1, wherein:
the at least one image signal is provided, by the processor, to a second image module configured to determine an image of one or more pilots in a cockpit.

4. The audio-visual pilot activity recognition system according to claim 3, wherein, if an image of one or more pilots is determined, the at least one image signal is passed to a third image module configured to estimate posture positions of the one or more pilots, wherein the posture positions are detected as two-dimensional keypoints of joints of the one or more pilots.

5. The audio-visual pilot activity recognition system according to claim 4, wherein the at least one image signal of the first image module and the at least one image signal passed to the third image module are combined in a fourth image module to create a three-dimensional scene reconstruction.

6. The audio-visual pilot activity recognition system according to claim 5, wherein the at least one image signal from the fourth image module is passed to a fifth image module for pre-processing the data.

7. The audio-visual pilot activity recognition system according to claim 1, wherein:
the at least one audio signal is provided through an audio feed of the processor to a speaker recognition configured to identify audio signals from the one or more audio collectors;
the system is configured to detect and isolate pilot speech in the audio signals; and
the system is configured to extrapolate the isolated audio signals to be pre-processed in a first audio module.

8. The audio-visual pilot activity recognition system of claim 7, wherein the at least one image signal and isolated audio signals are configured to pass to a network architecture module after pre-processing.

9. The audio-visual pilot activity recognition system according to claim 8, wherein:
the network architecture module includes a first subnetwork module and a second subnetwork module;
the at least one image signal is configured to pass to the first subnetwork module and the isolated audio signals are configured to pass to the second subnetwork module;
the network architecture module is configured to determine if the image signals at the first subnetwork module correspond to the isolated audio signals at the second subnetwork module; and
the network architecture module includes a fusion layer module configured to retrieve corresponding pairs of the at least one image signal and the isolated audio signals.

10. The audio-visual pilot activity recognition system according to claim 9, wherein:
the corresponding pairs of the at least one image signal and the isolated audio signals are configured to pass to a pilot activity recognition module; and
the pilot activity recognition module is configured to determine the pilot activity.

11. The audio-visual pilot activity recognition system according to claim 1, wherein the pilot activity includes one or more of the following:
pilot is seated and maneuvering;
pilot is leaving for a break;
pilot is resuming main operation;
pilot is inoperative or idle;
pilot is interacting with another person and/or pilot;
pilot is talking to ground control or Air Traffic Control;
pilot is reading or consulting a document;
pilot is drinking or eating;
pilot is falling; and
pilot is entering after a break.

12. The audio-visual pilot activity recognition system according to claim 11, wherein:
the pilot activity determined by a pilot activity recognition module is configured to pass to a fusion module; and
the fusion module is configured to receive information from one or more sensors or modalities to determine a final pilot state.

13. The audio-visual pilot activity recognition system according to claim 12, wherein the fusion module is configured to determine if an alert is needed.

14. A method for recognizing pilot activity, the method comprising:
collecting, via a processor, at least one image signal from one or more image collectors;
collecting, via the processor, at least one audio signal from one or more audio collectors; and
determining, via the processor, pilot activity based on the collected at least one image signal and the collected at least one audio signal;
wherein the at least one image signal is provided through a video feed of the processor to a frame buffer; and
wherein the at least one image signal is provided, by the processor, to a first image module configured to extract depth information from the at least one image signal.

* * * * *